United States Patent
Nomura et al.

(10) Patent No.: US 8,576,421 B2
(45) Date of Patent: Nov. 5, 2013

(54) PRINTER AND METHOD OF CONTROLLING THE SAME

(75) Inventors: Reiko Nomura, Azumino (JP); Kiyoshi Mukaiyama, Shiojiri (JP)

(73) Assignee: Seiko Epson Corporation, Shiojiri-Shi (JP)

( * ) Notice: Subject to any disclaimer, the term of this patent is extended or adjusted under 35 U.S.C. 154(b) by 1190 days.

(21) Appl. No.: 11/881,275

(22) Filed: Jul. 26, 2007

(65) Prior Publication Data
US 2008/0024829 A1  Jan. 31, 2008

(30) Foreign Application Priority Data
Jul. 27, 2006 (JP) ................................. 2006-204875

(51) Int. Cl.
*G06K 15/00* (2006.01)
*G03G 15/00* (2006.01)

(52) U.S. Cl.
USPC ....... 358/1.14; 358/1.12; 358/1.13; 358/1.16; 358/1.17; 358/1.18; 399/16; 399/17; 399/18; 399/19; 399/20

(58) Field of Classification Search
CPC ........ B41J 11/44; B41J 13/00; B41J 13/0027; B41J 13/0009; H04N 1/00567; H04N 1/00588; H04N 1/00631; H04N 1/00657; H04N 2201/0082; G06K 15/16
USPC ......... 358/1.11–1.18, 1.9, 1.3, 501–504, 296; 399/8, 9, 16–20
See application file for complete search history.

(56) References Cited

U.S. PATENT DOCUMENTS

| 5,630,032 A * | 5/1997 | Yamaguchi et al. ......... 358/1.16 |
| 6,665,081 B1 * | 12/2003 | Suzuki et al. ................ 358/1.13 |
| 7,184,167 B1 * | 2/2007 | Ito et al. ....................... 358/1.18 |
| 7,259,874 B2 * | 8/2007 | Nishikawa et al. ............ 358/1.1 |
| 2003/0184807 A1 * | 10/2003 | Tsuchitoi ..................... 358/1.18 |
| 2003/0202831 A1 * | 10/2003 | Matsunaga et al. ............. 400/76 |
| 2006/0001896 A1 * | 1/2006 | Sakamoto .................... 358/1.13 |
| 2006/0077462 A1 * | 4/2006 | Saito ........................... 358/1.15 |

FOREIGN PATENT DOCUMENTS

| JP | 08-174938 A | | 7/1996 |
| JP | 08174938 A | * | 7/1996 |
| JP | 11-232065 A | | 8/1999 |
| JP | 11232065 A | * | 8/1999 |
| JP | 2003-072964 A | | 3/2003 |
| JP | 2005-074684 A | | 3/2005 |
| JP | 2005074684 A | * | 3/2005 |
| JP | 2005170058 A | * | 6/2005 |

* cited by examiner

*Primary Examiner* — Twyler Haskins
*Assistant Examiner* — Chad Dickerson
(74) *Attorney, Agent, or Firm* — Nutter McClennen & Fish LLP; John J. Penny, Jr.; Derek P. Roller

(57) ABSTRACT

Disclosed is a printer for performing a process on the basis of received print data, the process including feeding a print sheet for a page, printing on the fed sheet, and ejecting the printed sheet. The printer includes a controller that allows a sheet for a succeeding page to be ejected without being printed when allowing the sheet for the succeeding page to be fed before completion of the process on another sheet for a preceding page which is in progress and then recognizing the end of a print data block corresponding to the succeeding page.

5 Claims, 3 Drawing Sheets

PRINTER AND METHOD OF CONTROLLING THE SAME

CROSS REFERENCES TO RELATED APPLICATION

This application is based on Japanese Patent Application No. 2006-204875 filed on Jul. 27, 2006, in Japanese Patent Office, the entire contents of which is hereby incorporated by reference.

BACKGROUND

1. Technical Field

The present invention relates to printers capable of continuously processing a plurality of pages and, in particular, relates to a printer capable of, when ejecting a sheet for a preceding page and simultaneously feeding another sheet for a succeeding page, appropriately dealing with the sheet for the succeeding page.

2. Related Art

When receiving print data from a host computer, serving as a print-request transmission source, a general printing apparatus, such as an ink jet printer, performs a process of feeding a sheet of paper as a printing medium (paper feed), allowing a printing mechanism to perform printing on the sheet, and ejecting the printed sheet (paper ejection). In a case of a print request for printing a plurality of pages, the apparatus repeatedly executes the above-described process for each page. In other words, after a sheet serving as a preceding page is ejected, another sheet serving as a succeeding page is fed.

JP-A-11-232065 discloses a technique for paper feed/ejection control. According to the technique, a sheet for a preceding page is ejected simultaneously with feeding of another sheet for a succeeding page in order to increase processing speed. Specifically, according to this related art, when data based on a print request is developed into actual image data in a print control apparatus realized by a host computer, page information indicating the presence of a succeeding page is added to a preamble portion of the actual image data and the resultant image data is transmitted to a printing apparatus so that the printing apparatus ejects a sheet as the preceding page simultaneously with feeding of another sheet as the succeeding page.

SUMMARY

In the related art, however, when the sheet as the preceding page is ejected simultaneously with feeding of the other sheet as the succeeding page, print data corresponding to the succeeding page may not exist. For example, the succeeding page contains only information about line feed or form feed and does not include data to be actually printed.

In addition, transmission of print data from the host computer may be interrupted due to an instant power failure or a network error. If such an event occurs during feeding of the sheet as the succeeding page simultaneously with ejection of the other sheet as the preceding page, print data corresponding to the succeeding page and a paper ejection command following the print data are not received. Unfortunately, the fed sheet as the succeeding page is not transported, i.e., the sheet is stopped.

If the fed sheet is remaining in the printing apparatus, the sheet may be bent (curled). The bent sheet is come into contact with a head for performing printing. Consequently, various troubles, e.g., head damage and extreme sheet modification, may be caused. The related art has a challenge in processing a fed sheet.

An advantage of some aspects of the invention is to provide a printer capable of continuously processing a plurality of pages and, when ejecting a sheet for a preceding page and simultaneously feeding another sheet for a succeeding page, appropriately dealing with the sheet for the succeeding page.

According to an aspect of the invention, there is provided a printer for performing a process on the basis of received print data, the process including feeding a print sheet for a page, printing on the fed sheet, and ejecting the printed sheet. In the printer, when a sheet for a succeeding page is fed before completion of the process on another sheet for a preceding page which is in progress, if the end of a print data block corresponding to the succeeding page is recognized, the sheet for the succeeding page is ejected without being printed.

It is preferable that the end of the print data block corresponding to the succeeding page is recognized on the basis of reception of a command indicating the end of the print data block corresponding thereto, or a lapse of a predetermined time during which the print data block corresponding to the succeeding page is not received.

It is further preferable that page information indicating the presence of a succeeding page is added to a print data block corresponding to a page which has a succeeding page. When the page information is added to a print data block corresponding to the preceding page, the sheet for the succeeding page is fed before completion of the process on the sheet for the preceding page.

According to another aspect of the invention, there is provided a method of controlling a printer for performing a process on the basis of received print data, the process including feeding a print sheet for a page, printing on the fed sheet, and ejecting the printed sheet. The method includes ejecting a sheet for a succeeding page without printing on the sheet when the sheet for the succeeding page is fed before completion of the process on another sheet for a preceding page which is in progress and the end of a print data block corresponding to the succeeding page is then recognized.

Other and further features and advantages of the invention will be apparent from the following description of embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
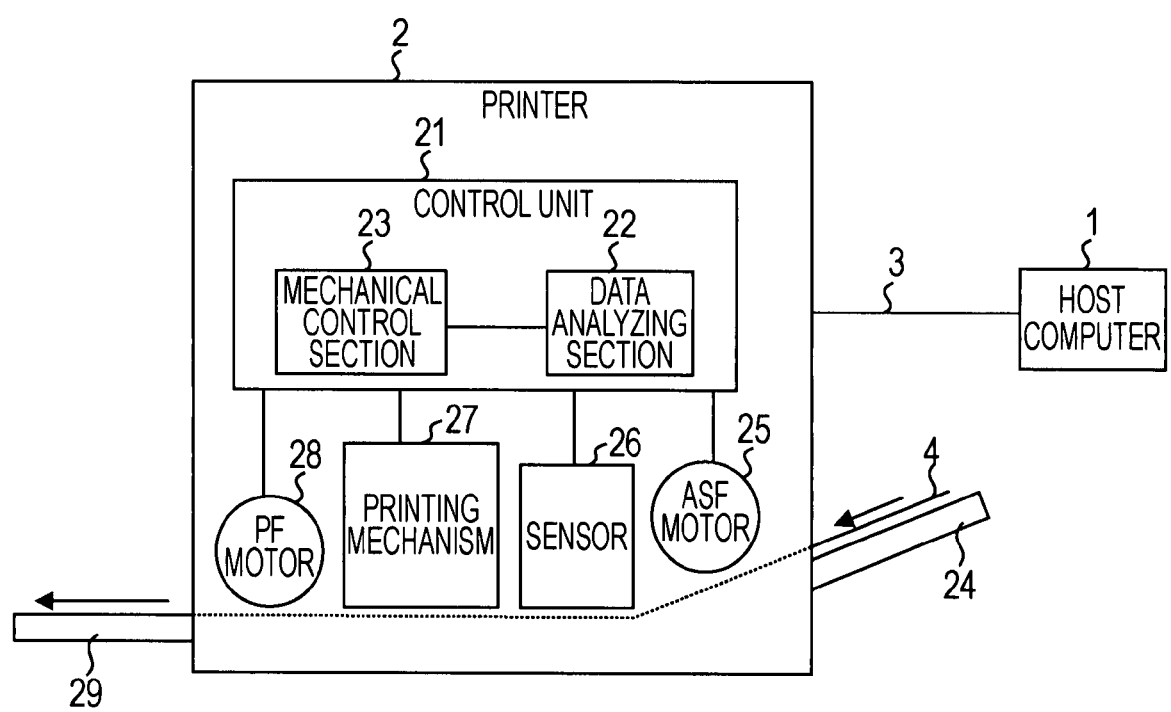
FIG. 1 is a diagram illustrating the structure of a printer according to an embodiment of the invention.

An embodiment of the invention will now be described with reference to the drawings. The embodiment does not restrict the scope of the invention. In the following description, the same or similar components in the drawings are designated by the same reference numerals or signs.

FIG. 1 is a diagram illustrating a printer 2 according to an embodiment of the invention. It is assumed that, while processing a sheet for a preceding page, the printer 2 feeds a sheet for a succeeding page on the basis of page information indicating the presence of the succeeding page. When the printer 2 receives information indicating the end of the succeeding page without receiving image data related to the succeeding page, alternatively, if the printer 2 does not receive data related to the succeeding page even after a lapse of a predetermined time, the printer 2 ejects the fed sheet for the succeeding page to appropriately deal with the sheet fed simultaneously with processing of the other sheet for the preceding page.

According to the embodiment, the printer 2, such as an ink jet printer, is connected to a host computer 1 through a network 3 as shown in FIG. 1. The printer 2 can receive a print request from the host computer 1. The host computer 1 includes a driver for the printer 2. Upon outputting a print request, the driver generates print data for the printer 2 and transmits the data to the printer 2. In this instance, under normal conditions, when one print job related to the print request includes a plurality of pages, page information indicating the presence of a succeeding page is added to each page (data block) other than the last page (data block).

Referring to FIG. 1, the printer 2 includes a control unit 21, functioning as a controller, and mechanical components. The control unit 21 includes a data analysis section 22 and a mechanical control section 23. The data analysis section 22 sequentially receives print data blocks transmitted from the host computer 1, stores the received data blocks, sequentially analyzes the stored data blocks, and outputs instructions based on the results of analysis to the mechanical control section 23. Processes by the data analysis section 22, particularly, processing of a sheet for a succeeding page is a major feature of the printer 2, the processing being started during processing of another sheet for a preceding page. The processing will be described in detail below. The data analysis section 22 may include a ROM that stores a program that gives instructions for processes, a CPU that executes a process in accordance with the program, and a RAM (data buffer) that stores the received print data.

The mechanical control section 23, serving as a mechanical controller, controls the operations of the respective mechanical components of the printer 2 in accordance with instructions from the data analysis section 22. For example, in order to feed a sheet 4, serving as a printing medium, the mechanical control section 23 activates an automatic sheet feeder (ASF) motor 25 in accordance with a paper feed instruction from the data analysis section 22 to transport the sheet 4 to a predetermined position and, after that, transmits information indicating the completion of paper feed to the data analysis section 22.

Referring to FIG. 1, the mechanical components of the printer 2 include the ASF motor 25, a sensor 26, a printing mechanism 27, and a paper feed (PF) motor 28. The ASF motor 25 is a paper feed motor that is activated to guide a sheet 4 in a paper feed tray 24 to the predetermined position in the vicinity of the printing mechanism 27.

The PF motor 28 is activated to transport the fed sheet 4 in an ejecting direction in which the sheet is ejected. During the transportation, the printing mechanism 27 performs printing on the sheet 4 which is being transported. After the printing, the sheet 4 is ejected to a paper ejection tray 29.

The sensor 26 detects the leading and trailing edges of the sheet 4 which is fed and is transported. In other words, the sensor 26 detects the position of the sheet 4. The position of the sheet 4 is also detected on the basis of the amount of transportation by the ASF motor 25 and the paper feed motor 28.

Since the printer 2 is the ink jet printer, the printing mechanism 27 has a head including a plurality of nozzles for ejecting ink. The printing mechanism 27 is mounted on a carriage. While being moved on the sheet 4 in the main scanning direction, the printing mechanism 27 ejects ink droplets to perform printing.

The printer 2 with the above-described structure in accordance with the embodiment performs a process upon printing as follows.

When a print request is issued from an application in the host computer 1, the driver (for the printer 2) in the host computer 1 generates print data blocks and sequentially transmits the data blocks in a predetermined batch to the printer 2. For example, data transmission is performed each time one print pass of image data is generated.

Figure 2:
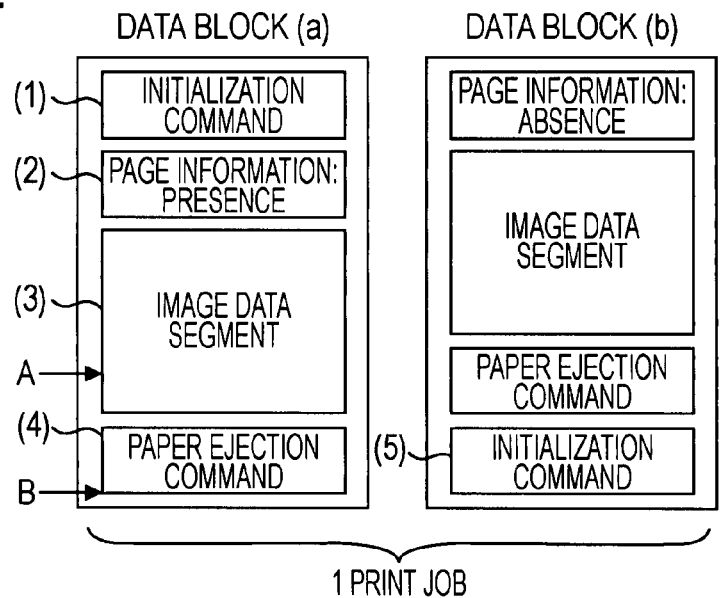
FIG. 2 schematically illustrates print data blocks corresponding to respective pages, the data blocks being transmitted from a host computer 1 and being processed by a data analysis section 22.
Figure 2:
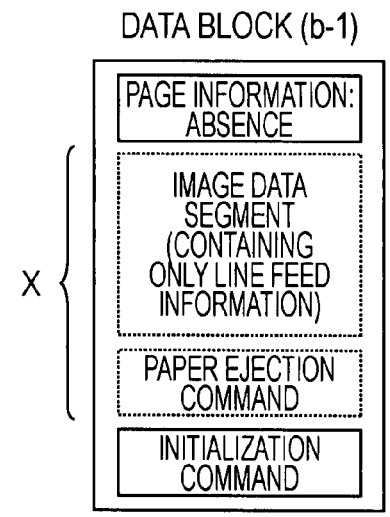
Figure 2:
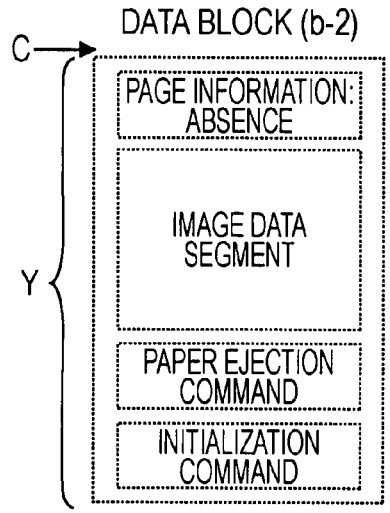

In the printer 2, the data analysis section 22 sequentially stores the received data blocks in the data buffer and sequentially reads the stored data blocks to analyze the data blocks. FIG. 2 schematically shows print data blocks corresponding to pages, the data blocks being transmitted from the host computer 1 and being processed by the data analysis section 22.

Referring to FIG. 2, a data block (a) corresponds to a first page included in one print job. Generally, a command (1) for initializing the internal state of the printer is added to a head portion of the data block (a). Page information (2) indicating the presence or absence of a succeeding page, an image data segment (3) corresponding to an image to be printed, and a paper ejection command (4) for ejecting a sheet, serving as that page, are sequentially arranged so as to follow the initialization command (1) in the data block (a). Those commands, the page information, and the image data segment are contained as data segments in the data block. In each of data blocks corresponding to second and subsequent pages, the above-described data segments (2) to (4) other than the initialization command (1) are arranged. An initialization command (5) is added to a data block (b) corresponding to the last page. The page information (2) indicating the presence or absence of a succeeding page is arranged regardless of whether a succeeding page exists or not. Alternatively, the page information (2) may be added to a data block only when a page corresponding to the data block has a succeeding page. The initialization command (5) in the last data block, corresponding to the last page, in the job may be omitted.

The data analysis section 22 analyzes the initialization command (1) and issues an instruction for initialization. Specifically, the data analysis section 22 recognizes the data block as print data and outputs a paper feed instruction to the mechanical control section 23. When receiving the instruction, the mechanical control section 23 activates the ASF motor 25 to transport the sheet 4 to the predetermined position. After completion of the transportation, the mechanical control section 23 transmits information indicating the completion to the data analysis section 22.

When receiving the information, the data analysis section 22 recognizes the completion of preparation for printing and then analyzes the next data segment. The page information (2), which is subsequently read, is used for determination of whether a sheet for a succeeding page should be fed. Accordingly, the page information (2) is stored in a predetermined portion in the data buffer. After that, the data analysis section 22 reads and analyzes the image data segment (3) and outputs a print instruction for performing printing on the fed sheet 4. The image data segment (3) contains an appropriate paper advance command, thus sequentially repeatedly giving a print instruction based on the image data segment to the head and a paper advantage instruction associated with the sheet 4 to the PF motor 28.

After completion of processing of the image data segment (3) related to the first page, the data analysis section 22 reads the paper ejection command (4) and issues a paper ejection instruction for ejecting the printed sheet 4 to the mechanical control section 23. When receiving the instruction, the mechanical control section 23 controls the PF motor 28 to eject the printed sheet 4 to the paper ejection tray 29. As described above, a print data block of one page is processed. The data blocks corresponding to the subsequent pages are substantially similarly processed.

Figure 3:
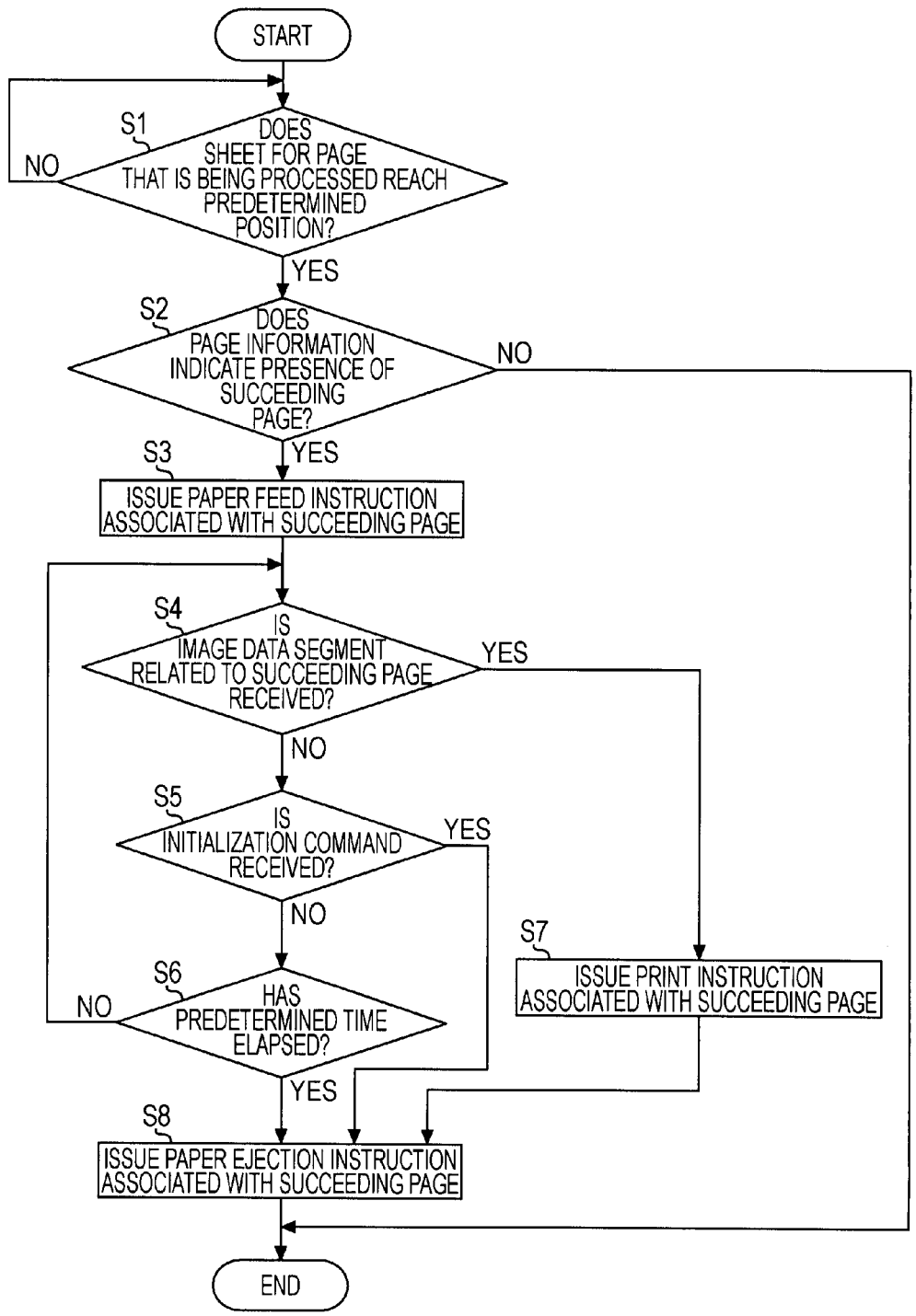
FIG. 3 is a flowchart of processing of a sheet for a succeeding page, the processing being started during processing of another sheet for a preceding page.

Processing performed when a sheet for a succeeding page is fed during processing of another sheet for a preceding page will now be described. The processing is a feature of the printer 2 as described above. FIG. 3 is a flowchart of the processing of a sheet for a succeeding page, the processing being started during processing of another sheet for a preceding page. This process of FIG. 3 includes processing parts performed by the data analysis section 22. First, the data analysis section 22 detects whether a sheet for a page (preceding page) which is being processed reaches the predetermined position (step S1).

The detection of the arrival is made when, for example, it is recognized that the sheet for the preceding page has been transported by a predetermined distance after the sensor 26 detected the trailing edge of the sheet. When the sheet reaches the predetermined position, another sheet 4 for the next page (succeeding page) can be fed. In other words, if the sheet (succeeding sheet) for the succeeding page is fed upon arrival of the other sheet (preceding sheet) for the preceding page at the predetermined position, the leading edge of the succeeding sheet does not come into contact with the trailing edge of the preceding sheet.

The position of the preceding sheet varies depending on the design of the printer 2. For example, it is assumed that the printer is designed such that the leading edge of a fed sheet 4 is arranged near a print position after paper feed and a preceding sheet for a preceding page does not reach the predetermined position unless printing on the preceding sheet is completed, irrespective of a print range of the preceding page. In this case, the detection (step S1) of the arrival of the sheet for the preceding page at the predetermined position is made at the time when printing on the sheet for the preceding page is completed. Therefore, the data analysis section 22 detects the arrival after completion of processing of the image data segment (3) related to the preceding page, e.g., upon processing of the paper ejection command (4) related thereto. Assuming that the data block (a) in FIG. 2 corresponds to the preceding page, the arrival is detected at time shown by, for example, an arrow B in FIG. 2.

On the other hand, it is assumed that the printer is designed such that the leading edge of a fed sheet 4 is considerably before the print position after paper feed and a preceding sheet for a preceding page may reach the predetermined position before completion of printing on the preceding sheet. In this case, the arrival is detected during processing of an image data segment (3) related to the preceding page, the image data segment determining the print range of the page. Assuming that the data block (a) in FIG. 2 corresponds to the preceding page, the arrival is detected at time shown by, for example, an arrow A in FIG. 2.

When the arrival of the preceding sheet as the preceding page at the predetermined position is detected (YES in step S1), the data analysis section 22 reads the stored page information (2) related to the preceding page and determines whether a succeeding page exists (step S2). If the page information (2) indicates the presence of the succeeding page (YES in step S2), the data analysis section 22 issues a paper feed instruction associated with a sheet for the succeeding page (step S3). On the other hand, if the page information (2) indicates the absence of a succeeding page (NO in step S2), processing of a succeeding sheet as a succeeding page is not performed during processing of the preceding sheet as the preceding page. Accordingly, the process of the succeeding sheet is terminated, the process being to be started during processing of the preceding sheet.

A word "processing" of "processing of the preceding sheet" indicates a condition that printing or ejecting for the preceding sheet is on the way and not completed regardless stopping or moving. A condition for feeding the succeeding sheet can be expressed that the succeeding sheet can be fed before the ejecting process of the preceding sheet is completed. It's because the printing process is already completed when the ejecting process starts.

Referring to FIG. 2, the data blocks (a) and (b) correspond to the first and second pages in one print job including two pages, respectively. Assuming that the second page in the print job contains only line feed information, a data block (b-1) corresponds to the second page. A data block (b-2) indicates missing data, i.e., the data block corresponding to the second page in the print job is not received for some reason. Assuming that the preceding page corresponds to the data block (a), this data block contains the page information (2) indicating the presence of a succeeding page. Accordingly, a paper feed instruction for the succeeding page corresponding to the data block (b), (b-1), or (b-2) is issued. Assuming that the preceding page corresponds to the data block (b), this data block contains the page information (2) indicating the absence of a succeeding page. Accordingly, the process is terminated as described above.

After the paper feed instruction associated with the succeeding page is issued (step S3), the data analysis section 22 determines whether an image data segment related to the succeeding page is received (step S4). If the image data segment related to the succeeding page is received (YES in step S4), the data analysis section 22 issues a print instruction associated with the succeeding page (step S7). Specifically, as described above, the data analysis section 22 reads the received and stored image data segment from the data buffer, analyzes the read data segment, and outputs an instruction based on the result of analysis to the mechanical control section 23.

Referring to FIG. 2, assuming that the succeeding page corresponds to the data block (b), the normal image data segment (regarding an object to be actually printed) is received within a predetermined time, which will be described later. As described above, therefore, the print instruction associated with the succeeding page is issued, so that the printing mechanism 27 performs printing on the fed sheet 4.

After the printing on the sheet for the succeeding page is completed as described above, a paper ejection command following the image data segment is ordinarily received. The data analysis section 22 issues a paper ejection instruction associated with the succeeding page on the basis of this command (step S8).

On the other hand, if the image data segment related to the succeeding page is not received (NO in step S4), the data analysis section 22 determines whether an initialization command is received (step S5). If the initialization command is received (YES in step S5), the data analysis section 22 issues a paper ejection instruction associated with the fed sheet 4 for the succeeding page (step S8). In this instance, the reception of the initialization command means that the print job which is being executed is finished. Therefore, this means that the data block corresponding to the succeeding page is ended. In this case, the succeeding page is ended without reception of an image data segment related to the succeeding page. Since printing is not performed on the already fed sheet 4, a paper ejection control is performed. As described above, the end of the succeeding page is recognized by reception of the initialization command. An end command indicating the end of the succeeding page may be added to the data block corresponding to the succeeding page. In this case, the end of the succeeding page can be recognized by reception of the end command. The end of the succeeding page may be recognized in another way.

If the succeeding page corresponds to the data block (b-1) in FIG. 2, the image data segment related to the succeeding page includes only the line feed information. Accordingly, an image data segment and a paper ejection command, which are shown as part X in FIG. 2, are deleted. In step S4, therefore, it is determined that an image data segment related to the succeeding page is not received. After that, it is determined that the initialization command is received within the predetermined time, which will be described later. Consequently, the sheet for the succeeding page is ejected as described above.

On the other hand, if the initialization command related to the succeeding page is not received (NO in step S5), the data analysis section 22 determines whether the predetermined time has elapsed since the sheet for the succeeding page was fed (step S6). If the predetermined time has not elapsed (NO in step S6), the process is returned to step S4. After that, steps S4 to S6 are appropriately repeated. If the predetermined time has elapsed without reception of either the image data segment related to the succeeding page or the initialization command related thereto (YES in step S6), a paper ejection instruction associated with the succeeding page is issued (step S8). In this case, although a sheet for the succeeding page is fed in accordance with the page information related to the preceding page, it is determined that the succeeding page is ended because any data segment related to the succeeding page is not received. Thus, the sheet for the succeeding page is ejected.

Assuming that the succeeding page corresponds to the data block (b-2) in FIG. 2, the above-described processing is performed. In FIG. 2, the data block (b-2) is to be received but the data block is not received because data transmission from the host computer 1 is interrupted by an error in the network 3 at any time, (e.g., time C in FIG. 2) before the reception of this data block corresponding to the succeeding page. In this case, this data block, shown as part Y in FIG. 2, corresponding to the succeeding page is not received. Accordingly, the image data segment and the initialization command are not received even after a lapse of the predetermined time. As described above, the fed sheet 4 is ejected without being printed.

If the paper ejection instruction is issued in step S8 as described above in any case, the PF motor 28 is activated to eject the sheet 4 for the succeeding page to the paper ejection tray 29. Thus, the process of the sheet for the succeeding page started during processing of the sheet for the preceding page is finished.

As described above, in the printer 2 according to the embodiment, in the case where a sheet for a succeeding page is fed on the basis of page information, indicating the presence of the succeeding page, contained in a data block corresponding to a preceding page during processing of a sheet for the preceding page, if a paper ejection command related to the succeeding page is not received, the sheet for the succeeding page is ejected on the basis of determination that the succeeding page is ended. More specifically, when a command, such as an initialization command, indicating the end of the succeeding page is received, or when any data segment related to the succeeding page is not received even after a lapse of a predetermined time, the fed sheet for the succeeding page is ejected. Therefore, if a data block corresponding to the succeeding page includes no object to be actually printed, e.g., the data block contains an image data segment including only line feed information though the sheet for the succeeding page is fed simultaneously with feeding of the sheet for the preceding page, or when transmission of the data block corresponding to the succeeding page is interrupted due to a communication error, the sheet for the succeeding page can be ejected without a paper ejection command related to the succeeding page. Advantageously, the sheet for the succeeding page can be prevented from remaining in the printer 2 for a long time as in a related printer, thus preventing various troubles caused by contact of the remaining curled sheet with the head.

It should be understood that the invention is not limited to the embodiment and the right scope of the invention contains all of an improvement, a modification and an equivalent covered in the appended claims.

What is claimed is:

1. A method of controlling a printer for performing a process on a basis of received print data, the process including using a printer to feed a first sheet, print on the first sheet, and eject the printed first sheet, the method comprising:
    feeding a second sheet into the printer without printing thereon before an ejecting process of the first sheet is completed when a print data block corresponding to the first sheet indicates the presence of the second sheet,
    recognizing with a controller an end of a print data block corresponding to the second sheet after feeding the second sheet, the end of the print data block being recognized on the basis of reception of a command indicating the end of the print data block corresponding to the second sheet when no image data segment related to the second sheet has been received, or a lapse of a predetermined time during which the command is not received, and
    ejecting the second sheet from the printer without printing on the second sheet when recognizing the end of the print data block corresponding to the second sheet.

2. The method according to claim 1, further comprising:
    receiving a paper ejection command and an initialization command,
    deleting the image data segment and the paper ejection command in the print data block corresponding to the second sheet when the print data block corresponding to the second sheet includes an image data segment containing only line feed information, and
    ejecting the second sheet without being printed in accordance with the initialization command even if the paper ejection command is deleted.

3. The method according to claim 2, further comprising:
    ejecting the second sheet without being printed after a lapse of a predetermined time during which the initialization command is not received since the image data segment and the paper ejection command are deleted.

4. The method according to claim 2, further comprising:
    receiving the image data segment, the paper ejection command, and the initialization command in that order, wherein the image data segment, the paper ejection command, and the initialization command are data segments contained in the print data block corresponding to the second sheet.

5. A printer for performing a process on a basis of received print data, the process including feeding a first sheet, printing on the first sheet, and ejecting the printed first sheet, the printer comprising:

a controller that is configured to:
  feed a second sheet without printing thereon before an ejecting process of the first sheet is completed when a print data block corresponding to the first sheet indicates the presence of the second sheet; and
  allow the second sheet to be ejected without being printed when an end of a print data block corresponding to the second sheet is recognized after feeding the second sheet, the end of the print data block being recognized on the basis of receiving a command indicating the end of the print data block corresponding to the second sheet when no image data segment related to the second sheet has been received, or a lapse of a predetermined time during which the command is not received.

* * * * *